Dec. 14, 1954     M. E. WOOD     2,696,951
ARBOR FOR FISHING REEL SPOOLS
Filed April 14, 1951     2 Sheets-Sheet 1
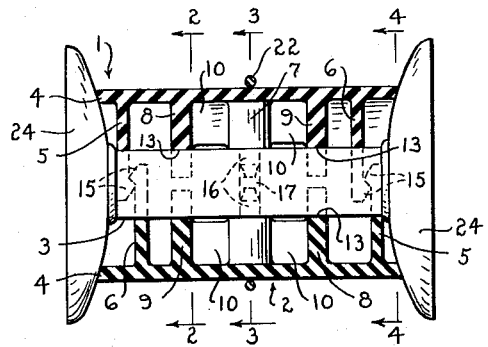
Fig.-1
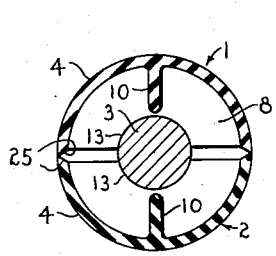
Fig.-2
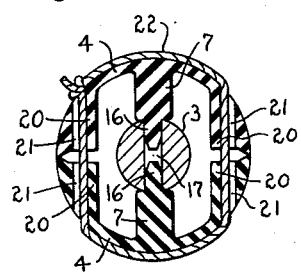
Fig.-3
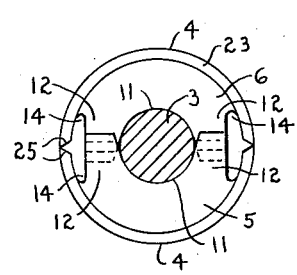
Fig.-4
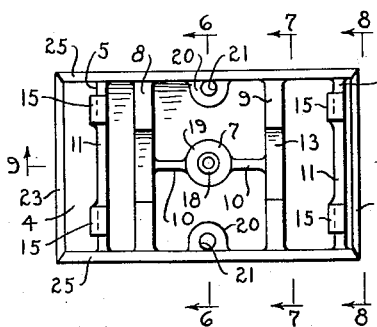
Fig.-5
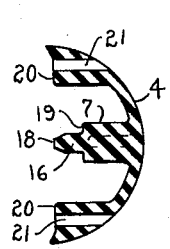
Fig.-6    Fig.-7    Fig.-8
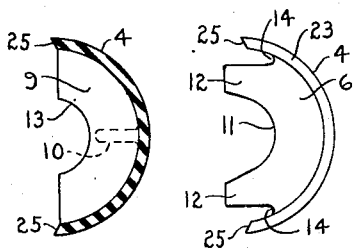
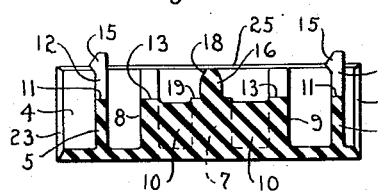
Fig.-9
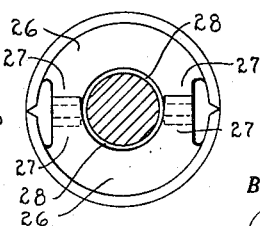
Fig.-10
INVENTOR.
MORRIS E. WOOD
BY Charles S. Perfild
ATTORNEY Dec. 14, 1954 M. E. WOOD 2,696,951
ARBOR FOR FISHING REEL SPOOLS
Filed April 14, 1951 2 Sheets-Sheet 2

*INVENTOR.*
MORRIS E. WOOD
BY
Charles S. Perfolt
ATTORNEY

United States Patent Office 2,696,951
Patented Dec. 14, 1954

2,696,951

ARBOR FOR FISHING REEL SPOOLS

Morris E. Wood, Bronson, Mich., assignor to Higbie Manufacturing Company, a corporation of Michigan Application April 14, 1951, Serial No. 221,004

4 Claims. (Cl. 242—119)

This invention relates generally to fishing tackle, and more particularly is directed to an accessory or arbor fitting adapted for association with the spool of a fishing reel.

This application is related to my copending applications Serial Numbers 57,653, now abandoned; 221,003 now Patent No. 2,669,399; and 222,428 now Patent No. 2,669,400.

In certain types of casting reels the diameter of the cylindrical line supporting surface is appreciably increased by permanently securing an arbor or drum to the spool, in order that less line may be used to better advantage. Due to the fact that the arbor in effect increases the diameter of the shaft, the convolutions of the line will be correspondingly increased to a substantially uniform diameter without resorting to a back fill of line. As a result, the line will not play out uniformly and smoothly at a faster speed when a cast is made but can be reeled in at a faster rate with less effort, thereby promoting the performance and usefulness of the reel.

When such an arbor constitutes an original permanent component part of the reel assembly the spool is in balance. However, if removed, it becomes damaged and if reassembled the spool generally becomes unbalanced. It is also usually difficult to reanchor or affix such an arbor against relative movement with respect to the spool.

The subject invention contemplates the utilization of an arbor which is adapted to be detachably connected to a conventional shaft or line supporting means in order to facilitate and expedite the proper delivery and return of the line, particularly while casting. Thus, the owner of a conventional reel may promote its efficiency by the simple expedient of attaching thereto the arbor embodying the improved principles of design and construction of the subject invention.

One of the principal objects of the invention is to provide an arbor preferably comprised of a minimum number of corresponding sections or parts which can be easily and quickly assembled and disassembled with respect to a spool an unlimited number of times.

An important object of the invention is to provide an arbor of the character just referred to, in which each of the sections includes a plurality of shaft-bearing supports provided with integral yieldable or resilient locking means and the locking means on one section are designed and constructed for interconnection with the locking means on the other section in a manner to hold the sections on the shaft. More particularly, the arrangement is preferably such that the locking means are snapped into connection with one another and do not necessarily engage the shaft.

A significant object of the invention is to provide an arbor comprised of corresponding sections, in which the yieldable or resilient locking means and shaft-bearing supports above referred to may be formed so that they are independent of one another; in other words, it is not essential that the resilient locking means be integral with the bearings.

Of further significance is the fact that the invention also contemplates a construction in which a locking means and a bearing spaced therefrom on one of the arbor sections are constructed to receive and grip the locking means on the other section. The invention is susceptible of various constructions and all of those disclosed herein provide an arrangement whereby portions of the arbor sections interlock with one another as distinguished from an arrangement in which portions actually engage and connect with a shaft. It is to be understood that insofar as the subject invention is concerned the arbor sections may also provide a support for film, tape or other line material.

A particular object of the invention is to provide an arbor in which at least one of the sections is provided with an integral projection adapted for disposition in the transverse line receiving aperture in a conventional shaft for the purpose of keying the arbor thereto for rotation with the spool.

Another object of the invention is to provide the arbor sections with pairs of apertures so arranged that when a line is passed therethrough and about the arbor the line will tend to maintain the arbor sections in assembly.

A further object of the invention is to design and construct the sections so they will cooperate with each other and the flanges of the spool in such a manner that the arbor provides a firm cylindrical support for the line, and the line is prevented from being caught between the end extremities of the sections and the inner convex surfaces of the spool flanges.

Additional objects or attributes of the invention reside in its simplicity, durability, light weight, and low cost of manufacture.

Other objects and advantages of the invention will become evident after considering the description hereinafter set forth in conjunction with the drawing annexed hereto.

In the drawing:

Figures 1 through 9 exemplify one embodiment of the invention, in which bearings formed on the arbor sections are provided with integral yieldable locking means;

Figure 1 is a front view of a conventional reel spool showing the arbor embodying the invention applied thereto, with portions of the arbor broken away for the purpose of illustrating its operative relationship with the spool;

Figure 2 is a transverse section taken substantially on line 2—2 of Figure 1;

Figure 3 is a transverse section taken substantially on line 3—3 of Figure 1 depicting the manner of keying the arbor sections to the shaft, and mode of connecting a fish line to such sections;

Figure 4 is a transverse section taken substantially on line 4—4 of Figure 1;

Figure 5 is an inside view of one of the arbor sections;

Figure 6 is a transverse section taken substantially on line 6—6 of Figure 5;

Figure 7 is a transverse section taken substantially on line 7—7 of Figure 5;

Figure 8 is an end view of one of the corresponding arbor sections looking in the direction of arrow lines 8—8 in Figure 5;

Figure 9 is a longitudinal section of an arbor section taken substantially on line 9—9 of Figure 5;

Figure 10 is a view similar to Figure 4 depicting a second embodiment of the invention in which the locking means are not integral with bearings;

Figures 11 through 19 exemplify a third embodiment of the invention, in which each arbor section, among other things, is provided with a separate bearing and separate yieldable locking means which coact to grip a locking means on the other section.

Figure 11:
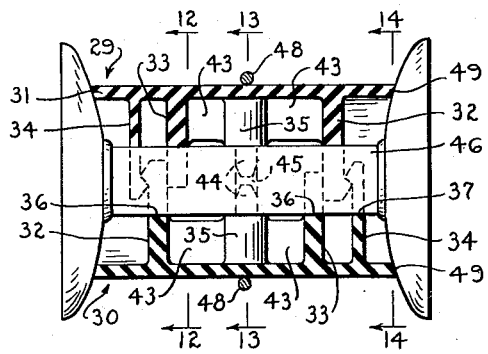
Figure 12:
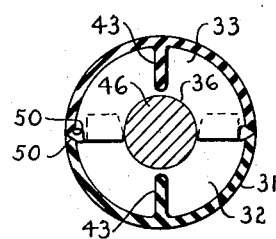
Figure 13:
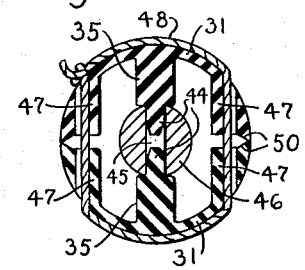
Figure 14:
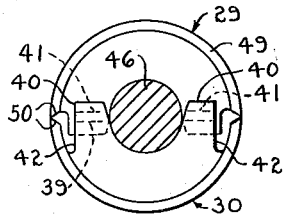
Figure 15:
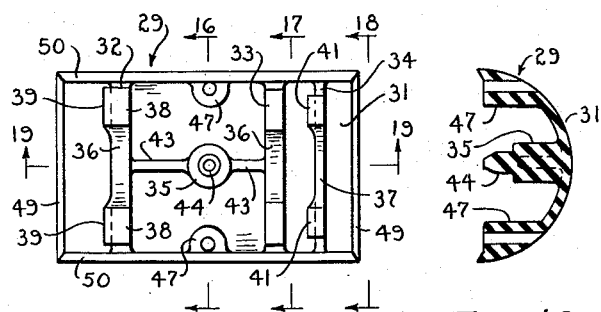
Figures 16, 17, 18:
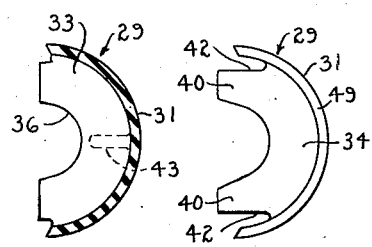
Figure 19:
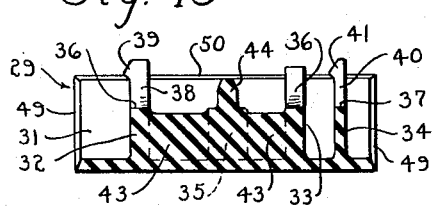

Figure 11 is a front view of a conventional reel spool similar to Figure 1, showing, among other things, the longitudinal spaced relationship of the bearings and yieldable locking means;

Figures 12, 13 and 14 are transverse sectional views taken substantially on lines 12—12, 13—13 and 14—14 of Figure 11, respectively;

Figure 15 is an inside view of one of the arbor sections shown in Figure 11;

Figures 16 and 17 are transverse sectional views taken substantially on lines 16—16 and 17—17 of Figure 15;

Figure 18 is an end view of an arbor section looking in the direction of arrow lines 18—18 of Figure 15; and Figure 19 is a longitudinal sectional view of an arbor section taken substantially on line 19—19 of Figure 15.

The embodiment of the invention depicted in Figures 1 through 9 of the drawing will be described first.

The arbor embodying the improved principles of design and construction of the subject invention exemplified in the drawing is preferably comprised of two sections 1 and 2, substantially identical in character and constructed of some desirable material impervious to water, such as moulded plastic having a certain yieldable property suitable for the purposes above described.

Each of the arbor sections is preferably made in the form of a shell substantially semi-cylindrical in character. These sections when assembled on a conventional shaft 3 of a fishing reel spool provide a firm cylindrical support for the line. More specifically each section includes, among other things, a semi-cylindrical line supporting wall 4 of uniform thickness, a pair of corresponding transverse or radial shaft engaging bearings 5 and 6 disposed adjacent the end extremities of the section and unequal distances from a center cylindrical radial bearing 7, and a pair of radial shaft engaging bearings 8 and 9 equally spaced from the center bearing and arranged between the end bearings 5 and 6. All of these shaft engaging bearings are integrally connected to the wall 4 and the bearings 8 and 9, which have a wall thickness somewhat greater than the wall thickness of bearings 5 and 6, are stabilized by a pair of longitudinal medial webs 10 joining the bearings 8 and 9 with center bearing 7 to impart substantial rigidity to each section as shown in Figures 2, 5 and 9. Although the webs are not intended to engage the shaft, they may nevertheless be provided with longitudinally extending shaft bearing surfaces.

The end bearings 5 and 6 are each provided with an arcuate shaft bearing surface 11 and a pair of adjacent yieldable or flexible corresponding finger portions 12. Each of the bearings 8 and 9 is provided with an arcuate shaft bearing surface 13. Yieldability of the fingers is obtained in some measure by the formation of interruptions or notches 14 provided in the bearings. The fingers 12 preferably extend beyond a plane formed by the longitudinal marginal edges of the sections, and the side of each finger is preferably provided with a generally V-shaped projection 15, the projections on each section facing in one direction. As will be pointed out more in detail subsequently, the fingers on one arbor section are adapted to snap connect with the fingers on the other section. The fingers have proven very efficient and durable, due in part to the fact that their flexation or movement is substantially in the plane perpendicular to their width. These fingers and the arcuate bearing surfaces in effect constitute bifurcations adapted to straddle the shaft. With this unique arrangement, the bearing surface referred to are well distributed along the length of each arbor section to promote balance and stability.

Each center radial bearing 7 is preferably provided with an integral radial projection 16 of a cross-sectional size somewhat less than that of the bearing proper. Each projection is adapted for disposition in one end of a line receiving aperture 17 in the spool shaft as exemplified in Figures 1 and 3 whereby to key the arbor sections to the shaft for rotation with the spool. The size of the projections and hole are such that a snug fit is established therebetween in order to prevent any lost motion or relative rotational movement between the arbor sections and shaft. The outer end of each projection is preferably provided with a frusto-conical portion 18 whereby to assist in piloting the projection into the aperture. Although not essential, the end 19 of each bearing 7 is adapted to bear against the shaft.

Any suitable means may be provided for attaching the fish line to the arbor, but as herein illustrated, this is preferably accomplished by forming an enlargement 20 on the inner side of wall 4 on each side of each arbor section and directly opposite from the center bearing 7. An aperture 21 extends through each enlargement in a general chordal direction or substantially parallel to the longitudinal axis of bearing 7. When the arbor sections are properly mounted on the spool the apertures 21 in one section are aligned with the corresponding apertures in the other section so that a line 22 may be threaded therethrough and about the sections and tied as depicted in Figure 3; and thereby assist, in some measure, to maintain the sections assembled. Obviously, it is not essential that the line be passed through both pairs of aligned apertures to secure the line about the arbor sections.

As clearly exemplified in the drawings, the end margins of the arbor sections are preferably beveled as indicated at 23 so that they will intimately engage the convex surfaces of the spool flanges 24. The longitudinal marginal edges of the sections are also preferably beveled as indicated at 25 so as to insure longitudinal engagement only adjacent the peripheral surfaces of the arbor sections. Such an arrangement serves to provide a stable support for the line, and at the same time will prevent the line from receding and becoming caught between the extremities of the sections and spool flanges.

The longitudinal spacings between the end bearings 5 and 6 with respect to the center bearing 7 and the end extremities of the arbor sections are such that when the sections are properly mounted on the shaft, the end bearings 5 and 6 on one section will be juxtaposed relative to the end bearings 6 and 5 on the other section, respectively. More particularly, the fingers on the end bearing 5 on one section are arranged in overlapping relationship with respect to the fingers on the end bearing 6 of the other section, and the same is true of the other end bearings.

In view of the foregoing description, it will be apparent that the arbor sections can be easily and quickly assembled with the spool shaft by merely arranging them in reversed positions to that the locking fingers on one section are brought into engagement with the fingers on the other section and the projections 16 are disposed opposite the ends of line receiving aperture 17, whereupon appropriate manual pressure toward the shaft will cause the v-projections on the fingers to cam and spread the fingers apart axially and when the arcuate bearing surfaces 10 and 12 engage the shaft the fingers will automatically retract and effect a snap interlocking connection between the projections as shown in Figure 1. Obviously, one section can be applied to the shaft in advance of the other. With this unique locking arrangement, the sections can be readily attached to the spool without the use of a plurality of separate, easy-to-lose parts, or application of tools for connecting the arbor to the shaft. In other words, the arbor is comprised solely of two substantially identical parts, and the design and construction are such that the method of attaching them to a spool is obvious. This is an important factor as it reduces considerably the cost of assembly in the factory, and facilitates assembly at the place of use. Moreover, since the arbor is constructed of an impervious material such as plastic, the overall weight of the reel is not materially increased, and any question of rust or corrosion is entirely eliminated.

The second embodiment of the invention is exemplified in Figure 10 of the drawing. This embodiment corresponds in every particular to the first embodiment, except for the fact that the pairs of locking fingers are not integral with bearings. More particularly in this regard, the arbor sections of this second embodiment are identical and provided with corresponding axially spaced bearings which are like the bearings 8 and 9 in the first embodiment. Each of the arbor sections is also provided with radial portions such as 26, and each of the radial portions with a pair of resilient locking portions preferably in the form of fingers 27, the pairs of corresponding resilient locking fingers on one arbor section being connectable with the fingers on the complementary arbor section. Attention is directed to the fact that the radial portions 26 are recessed at 28 so they do not find support on a shaft. In other words, the locking fingers are not directly integral with bearings but are spaced axially therefrom.

The third embodiment of the invention is illustrated in Figures 11 through 19 of the drawing. This embodiment is distinguishable from the other embodiments by providing each of the corresponding arbor sections with a pair of relatively rigid locking portions preferably in the form of fingers, a pair of relatively resilient locking portions preferably in the form of fingers, and a rigid bearing axially spaced between the respective pairs of fingers. The arrangement is preferably such that when the arbor sections are assembled on a spool the relatively rigid locking fingers on a first arbor section are received and gripped between the flexible fingers and rigid bearing on the second arbor section and the relatively rigid locking fingers on the second section is gripped between the flexible fingers and rigid bearing on the first section.

More particularly, the third embodiment includes, among other things, a pair of corresponding arbor sections, generally designated 29 and 30, each having a semi-cylindrical line or material supporting wall 31 of substantially uniform thickness, and three radial bearings 32, 33 and 34 spaced apart longitudinally from one another and unequal distances from a center cylindrical radial portion 35. The bearing 32 is located on one side of the center portion 35 and the bearings 33 and 34 on the other side of the portion 35. The bearings 32 and 33 are substantially of the same wall thickness and made relatively rigid. Each of the bearings 32 and 33 are provided with arcuate shaft engaging surfaces 36 and bearing 34 with a corresponding arcuate surface 37. The rigid bearing 32 is also provided with a pair of relatively rigid locking portions preferably in the form of fingers 38, each finger having a substantially V-shaped projection 39. The wall thickness of bearing 34 is preferably less than that of the other bearings and is provided with a pair of resilient or flexible locking portions preferably in the form of fingers 40 having V-projections 41 formed thereon which face axially in the same direction as projections 39. The flexible fingers 40 may be notched as indicated at 42 to promote flexibility.

Longitudinally extending webs 43 may be employed to join the bearings 32 and 33 to the center portion 35 to impart strength and rigidity to these bearings including the wall 31. The center portion 35 of each arbor section is provided with a projection 44 for insertion in a conventional line receiving aperture 45 in a shaft 46. The ends of the center portions 35 may engage the shaft as shown. Each section is further provided with a pair of tubular enlargements 47 for receiving a line 48 as shown in Figure 3 in the same manner as in the first embodiment. Furthermore, the marginal end edges 49 and longitudinal marginal edges 50 of each arbor section are preferably beveled for the purpose described above.

The arbor sections 29 and 30 of the third embodiment are adapted for inter-snap connection for detachably holding the sections on a spool as distinguished from a construction in which the sections have locking means which actually engage and interlock with a part of a spool such as the shaft thereof. When the arbor sections are applied to a spool in the reversed positions shown in Figure 11, the inner surfaces of fingers 38 on the rigid bearing 32 of one section will first bear against the outer surface of the bearing 33 on the other section to form a backing or abutment therefor. When additional pressure is applied to the sections the V-projections will engage one another causing the yieldable fingers 40 on the respective sections to cam outwardly and when the arcuate surfaces 36 and 37 on the three bearings engage the shaft 46 the fingers 40 will snap back to their normal positions, thereby placing portions of the V-projections on the respective sections on opposite sides of the longitudinal axis of the shaft. With this unique arrangement, the rigid fingers on one section are in effect gripped by a rigid bearing and flexible fingers on the other section.

While the foregoing invention has been described with great particularity, and in desirable forms, it will be readily understood that various changes in the arrangements, constructions and combinations of parts, as well as substitution of equivalents and substitution of materials may be made in the devices without departing from the spirit of the invention as definitely determined by the appended claims.

I claim:
1. In combination: a fishing reel spool, a pair of arbor sections, each of said arbor sections having a pair of inner bearing portions engaging the spool, an external line supporting portion, and a plurality of fingers integral with the line supporting portions located inwardly therefrom, and said fingers and bearing portions being arranged with a pair of fingers on one section caught between a bearing and a pair of fingers on the other section for detachably securing the sections together on the spool.

2. In combination: a fishing reel spool, a pair of corresponding arbor sections, each of said arbor sections having an external line supporting wall, a first inner bearing located adjacent one end of the section engaging the spool and provided with a locking portion, an internal locking member located adjacent the opposite end of the section, and a second inner bearing disposed between the first bearing and locking member engaging the spool, said arbor sections being arranged in reversed positions on the spool with the locking member and second bearing on the sections clamping the first bearings respectively therebetween.

3. A pair of complementary arbor sections for attachment to a spool having a shaft, each of said sections having an outer material supporting portion and a pair of longitudinally spaced internal bearing means for positioning and supporting the sections on a shaft, each one of said internal bearing means being provided with a pair of locking components, the locking components on one section being interconnectible with the locking components on the other section for securing the sections about a shaft to form an arbor therefor, and said pairs of locking components on one section being substantially identical to the pairs of locking components on other section.

4. A pair of complementary arbor sections for attachment to a spool having a shaft, each of said sections having an outer material supporting portion and internal bearing means for supporting the sections on a shaft, each of said sections also having a pair of internal formations longitudinally spaced from one another and from said bearing means, each of said formations being provided with a pair of locking components, the pairs of locking components on one section being interconnectible with the pairs of locking components on the other section for securing the sections together about a shaft to form an arbor therefor, and said pairs of locking components on one section being substantially identical in shape and position to the pairs of locking components on the other section.

References Cited in the file of this patent

UNITED STATES PATENTS

| Number | Name | Date |
| --- | --- | --- |
| 806,064 | Carter | Nov. 28, 1905 |
| 1,855,738 | Case | Apr. 26, 1932 |
| 2,190,013 | Byers | Feb. 13, 1940 |
| 2,336,981 | Clickner | Dec. 14, 1943 |
| 2,344,665 | Adams | Mar. 21, 1944 |